(12) United States Patent
Miller

(10) Patent No.: US 11,658,399 B2
(45) Date of Patent: May 23, 2023

(54) VEHICLE ANTENNA ASSEMBLY

(71) Applicant: TE Connectivity Services GmbH, Schaffhausen (CH)

(72) Inventor: Alan W. Miller, Milan, MI (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 17/366,358

(22) Filed: Jul. 2, 2021

(65) Prior Publication Data

US 2022/0006179 A1 Jan. 6, 2022

Related U.S. Application Data

(60) Provisional application No. 63/047,458, filed on Jul. 2, 2020.

(51) Int. Cl.
*H01Q 1/32* (2006.01)
*H01Q 9/27* (2006.01)
*B62D 35/00* (2006.01)
*H01Q 1/38* (2006.01)

(52) U.S. Cl.
CPC ......... *H01Q 1/3275* (2013.01); *B62D 35/007* (2013.01); *H01Q 1/38* (2013.01); *H01Q 9/27* (2013.01)

(58) Field of Classification Search
CPC .......... H01Q 1/32; H01Q 1/3275; H01Q 9/27; H01Q 5/371; H01Q 21/30
See application file for complete search history.

(56) References Cited

FOREIGN PATENT DOCUMENTS

| CN | 106797071 A | * | 5/2017 | ............... H01Q 1/22 |
| EP | 3139440 A1 | * | 3/2017 | ........... H01Q 1/3275 |
| JP | 2017168938 A | * | 9/2017 | ............... H01Q 1/32 |

OTHER PUBLICATIONS

Audi "AM/FM Film Antenna".
Samsung "AM/FM Film Antenna".
"AM/FM Film Trunk Lid Antenna".
Volkswagen "AM/FM Film Antenna Sideview Mirror".
Hirschmann Car Communication GMBH "Claas Antennenverstaerker".
Hirschmann Car Communication GMBH "Antenna Film ASM Antennenfolie Kpl".
Hirschmann Car Communication GMBH "AM/FM Thin Film Antenna".

\* cited by examiner

*Primary Examiner* — Hoang V Nguyen

(57) ABSTRACT

An antenna assembly for installation on a spoiler of a vehicle includes a substrate having an inner surface and an outer surface coupled to an interior surface of the spoiler of the vehicle. The substrate includes an upper substrate portion, a lower substrate portion and a rear substrate portion between the upper substrate portion and the lower substrate portion. The upper and lower substrate portions are oriented generally horizontally. The rear substrate portion is oriented generally vertically. The antenna assembly includes an antenna element coupled to the substrate having antenna members in a serpentine antenna pattern including cross members extending across the substrate and lateral members extending between the cross members. The antenna element includes an upper antenna portion, a lower antenna portion and a rear antenna portion between the upper antenna portion and the lower antenna portion.

20 Claims, 4 Drawing Sheets

VEHICLE ANTENNA ASSEMBLY

CROSS-REFERENCE TO RELATED APPLICATIONS

This application claims priority to U.S. Provisional Application No. 63/047,458, filed 2 Jul. 2020, titled "Spoiler AM/FM/DAB Film Antenna," which is incorporated by reference herein in its entirety.

BACKGROUND OF THE INVENTION

The subject matter herein relates generally to antenna assemblies for vehicles.

Various different types of antennas are used in the automotive industry. Conventional AM/FM radio antennas are rod antennas, known as a whip antenna, which may be coupled to the vehicle at the hood of the vehicle. It is desirable to eliminate the whip antenna. Locating the vehicle antenna at other locations is problematic due to limited available space. Closely positioning of the vehicle antenna to other elements may lead to interference. Space constraints of the vehicle antenna may lead to reductions in antenna performance.

A need remains for a reliable antenna assembly for a vehicle.

BRIEF DESCRIPTION OF THE INVENTION

In one embodiment, an antenna assembly for installation on a spoiler of a vehicle is provided. The antenna assembly includes a substrate having an inner surface and an outer surface. The outer surface is configured to be coupled to an interior surface of the spoiler of the vehicle. The substrate includes an upper substrate portion, a lower substrate portion and a rear substrate portion between the upper substrate portion and the lower substrate portion. The upper and lower substrate portions are oriented generally horizontally. The rear substrate portion is oriented generally vertically. The antenna assembly includes an antenna element coupled to the substrate. The antenna element includes antenna members in a serpentine antenna pattern include cross members extending across the substrate and lateral members extending between the cross members. The antenna element includes an upper antenna portion, a lower antenna portion and a rear antenna portion between the upper antenna portion and the lower antenna portion. The upper antenna portion is provided on the upper substrate portion. The lower antenna portion provided on the lower substrate portion. The rear antenna portion is provided on the rear substrate portion.

In another embodiment, an antenna assembly for a vehicle is provided. The antenna assembly includes an antenna housing having an upper wall, a lower wall, and a rear wall between the upper wall and the lower wall. The antenna housing forms a spoiler of the vehicle. The antenna housing has an interior enclosure defined by the upper wall, the lower wall, and the rear wall. The antenna assembly includes an antenna assembly received in the interior enclosure. The antenna assembly includes a substrate and an antenna element coupled to the substrate. The substrate has an inner surface and an outer surface. The outer surface is coupled to the antenna housing. The substrate includes an upper substrate portion, a lower substrate portion and a rear substrate portion between the upper substrate portion and the lower substrate portion. The upper and lower substrate portions are oriented generally horizontally. The rear substrate portion is oriented generally vertically. The upper substrate portion coupled to the upper wall. The rear substrate portion coupled to the rear wall. The lower substrate portion coupled to the lower wall. The antenna element includes antenna members in a serpentine antenna pattern includes cross members extend across the substrate and lateral members extend between the cross members. The antenna element includes an upper antenna portion, a lower antenna portion and a rear antenna portion between the upper antenna portion and the lower antenna portion. The upper antenna portion provided on the upper substrate portion. The lower antenna portion provided on the lower substrate portion. The rear antenna portion provided on the rear substrate portion.

In a further embodiment, an antenna assembly for installation on a spoiler of a vehicle is provided. The antenna assembly includes a substrate having an inner surface and an outer surface. The outer surface is configured to be coupled to an interior surface of the spoiler of the vehicle. The substrate includes an upper substrate portion, a lower substrate portion and a rear substrate portion between the upper substrate portion and the lower substrate portion. The upper and lower substrate portions are oriented generally horizontally. The rear substrate portion is oriented generally vertically. The antenna assembly includes a primary antenna element coupled to the substrate. The primary antenna element includes primary antenna members in a serpentine antenna pattern includes cross members extending across the substrate and lateral members extending between the cross members. The primary antenna element includes an upper antenna portion, a lower antenna portion and a rear antenna portion between the upper antenna portion and the lower antenna portion. The upper antenna portion is provided on the upper substrate portion. The lower antenna portion is provided on the lower substrate portion. The rear antenna portion is provided on the rear substrate portion. The primary antenna element operates as AM/FM antenna element. The antenna assembly includes a secondary antenna element coupled to the substrate. The secondary antenna element operating as a digital audio broadcasting (DAB) antenna element.

DETAILED DESCRIPTION OF THE INVENTION

Figure 1:
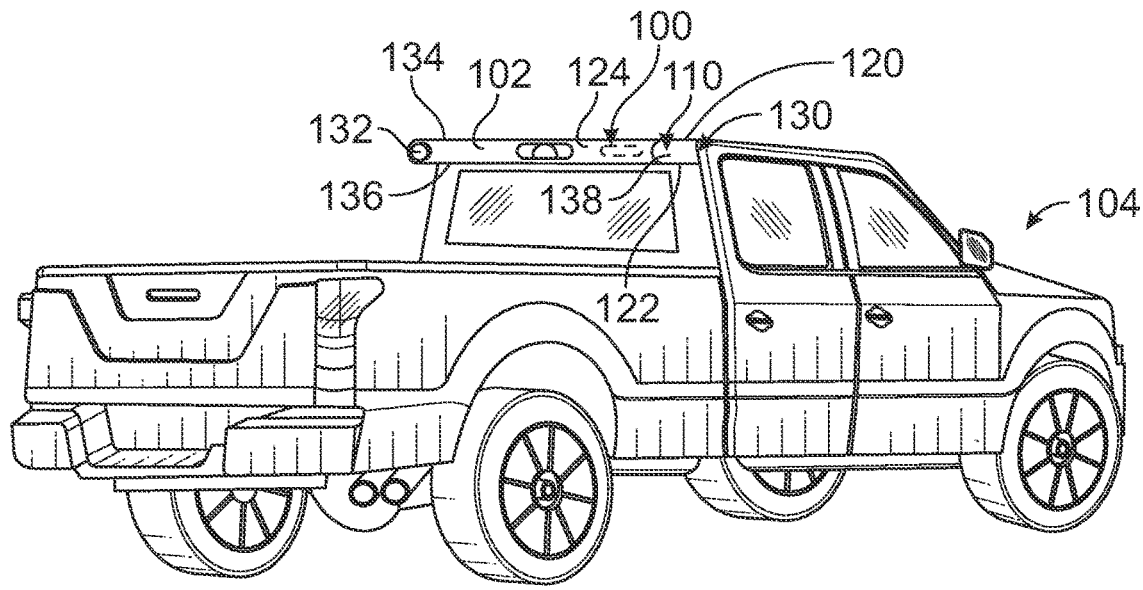
FIG. 1 illustrates an antenna assembly in accordance with an exemplary embodiment for installation on a spoiler of a vehicle.

FIG. 1 illustrates an antenna assembly 100 in accordance with an exemplary embodiment for installation on a spoiler 102 of a vehicle 104. The antenna assembly 100 is installed inside the spoiler 102, which in the illustrated embodiment is located at the rooftop of the vehicle 104. In various embodiments, the antenna assembly 100 integrates multiple antenna elements into a common structure mounted to the vehicle 104 for a wideband or multiband antenna automotive system. For example, the antenna assembly 100 may include terrestrial antenna elements operable in various frequencies, such as amplitude modulation (AM) frequencies, frequency modulation (FM) frequencies, digital audio broadcasting (DAB) frequencies, and the like).

The antenna assembly 100 includes an antenna housing 110 holding the antenna components. In an exemplary embodiment, a portion of the spoiler 102 defines the antenna housing 110. For example, the spoiler 102 forms a physical structure that supports the antenna components of the antenna assembly 100. The antenna housing 110 includes an upper wall 120, a lower wall 122, and a rear wall 124 between the upper wall 120 and the lower wall 122. A front 126 of the antenna housing 110 may be open and configured to be mounted to another portion of the vehicle 104, such as the cab of the vehicle. The antenna housing 110 includes an interior enclosure 128 defined by the upper wall 120, the lower wall 122, and the rear wall 124. In the illustrated embodiment, the vehicle 104 is a truck and the spoiler 102 is at a top of the cab, such as located above the rear window. For example, the upper wall 120 may be generally coplanar with the top of the cab of the truck. Other locations are possible in alternative embodiments. The spoiler 102 may be used on other type of vehicles other than a truck in alternative embodiments.

The spoiler 102 extends between a front 130 and a rear 132. The spoiler 102 has a top 134 and a bottom 136. The spoiler 102 has opposite sides 138 between the front 130 and the rear 132 and between the top 134 and the bottom 136. In an exemplary embodiment, the spoiler 102 is aerodynamically designed and has a ridge at the rear 132. The front 130 of the spoiler 102 is coupled to the rear of the cab of the truck. The antenna assembly 100 may be located along a portion of the spoiler 102, with other portions of the spoiler 102 used for other purposes, such as for other antenna assemblies, a brake light, and the like. In the illustrated embodiment, the antenna assembly 100 is located at the right side of the spoiler 102; however, the antenna assembly 100 may be at other locations in alternative embodiments.

Figure 2:
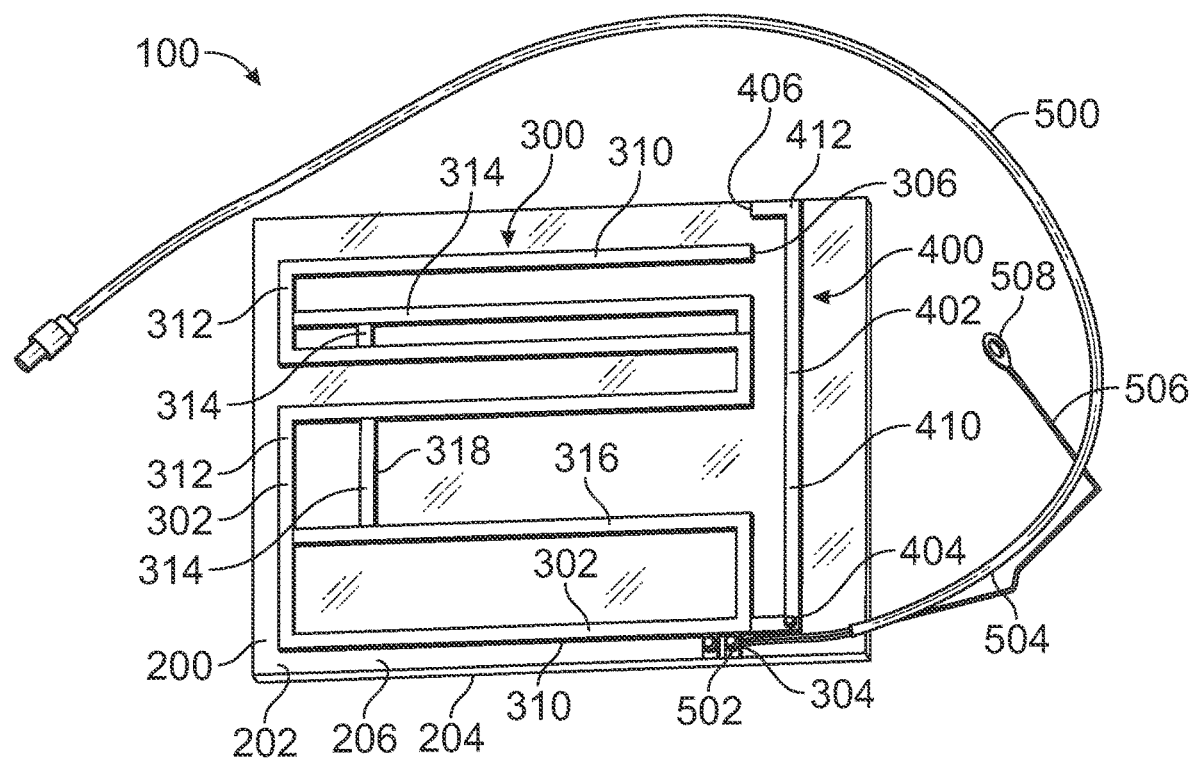
FIG. 2 illustrates the antenna assembly in accordance with an exemplary embodiment.

FIG. 2 illustrates the antenna assembly 100 in accordance with an exemplary embodiment. The antenna assembly 100 is shown in a flat configuration, such as post-manufacture but prior to assembly into the spoiler 102 (shown in FIG. 1). For example, the antenna assembly 100 may be folded or manipulated into a different shape during normal use.

The antenna assembly 100 includes a substrate 200 and one or more antenna elements coupled to the substrate 200. In the illustrated embodiment, the antenna assembly 100 includes a primary antenna element 300 and a secondary antenna element 400. The primary antenna element 300, or simply antenna element 300, is a terrestrial antenna element, such as an AM/FM antenna element. The antenna elements 300 is designed to operate over AM frequencies and FM frequencies. The secondary antenna element 400 is a terrestrial antenna element, such as a DAB antenna element. In alternative embodiments, the antenna assembly 100 may be provided without the secondary antenna element 400. In other various embodiments, the antenna assembly 100 may include other types of antenna elements in addition to the primary antenna elements 300 and/or the secondary antenna element 400.

The substrate 200 includes a flexible film 202 having an inner surface 204 and an outer surface 206. The flexible film 202 may be lightweight and conformal, such as for fitting into the interior of the spoiler 102. In an exemplary embodiment, the flexible film 202 is manufactured from a plastic material, such as a polyimide material. The flexible film 202 may be manufactured in multiple layers, such as insulating layers and conductive layers. In the illustrated embodiment, the flexible film 202 is rectangular in shape. However, the flexible film 202 may have other shapes in alternative embodiments.

The antenna element 300 includes a plurality of antenna members 302 extending from a feed point 304 to an end 306 of the antenna element 300. The antenna members 302 are conductive elements, such as copper conductors. In an exemplary embodiment, the antenna members 302 form a serpentine antenna pattern spanning back and forth across the substrate 200. The antenna members 302 may be formed directly on the substrate 200, such as being printed on the substrate 200. In alternative embodiments, the antenna members 302 may be formed by laser etching a copper foil applied to the substrate 200 to remove portions of the copper foil leaving the antenna members 302 in the antenna pattern on the substrate 200. Other forming techniques may be used in alternative embodiments.

In an exemplary embodiment, the antenna members 302 include cross members 310 extending across the substrate 200 and lateral members 312 extending between the cross members 310. In the illustrated embodiment, the cross members 310 extend side to side across the substrate 200 and lateral members 312 extend top to bottom along the substrate 200. Other orientations are possible in alternative embodiments. The cross members 310 and/or the lateral members 312 may be soldered together. Alternative, the cross members 310 and/or the lateral members 312 may be formed with each other during manufacture, such as by printing or etching. The shapes and lengths of the cross members 310 and the lateral members 312 affect the antenna characteristics (for example, target frequencies) of the antenna element 300.

In various embodiments, the antenna members 302 include stub portions 314 between the cross members 310 and/or the lateral members 312. The stub portions 314 provide additional conductive paths between the feed point 304 and the end 306. The stub portion 314 form different path lengths through the antenna element 300 between the feed point 304 and the end 306. The stub portions 314 widen the frequency bands in which the antenna element 300 operates efficiently. The shorter paths operate at higher frequencies and the longer path operate at lower frequencies. The stub portions 314 may be soldered to the cross members 310 and/or the lateral members 312. Alternative, the stub portions 314 are formed with the cross members 310 and/or the lateral members 312 during manufacture, such as by printing or etching.

The stub portions 314 extend generally parallel to the cross members 310 and/or the lateral members 312. However, the stub portions 314 may extend in other directions in alternative embodiments. In the illustrated embodiment, the stub portions 314 have similar widths to the cross members 310 and/or the lateral members 312. The stub portions 314 may have different widths in alternative embodiments, such as being wider or narrower than the cross members 310 and/or the lateral members 312. The shapes and lengths of the stub portions 314 affect the antenna characteristics (for example, target frequencies) of the antenna element 300.

In an exemplary embodiment, the stub portions 314 include cross stub portions 316 and lateral stub portions 318. The cross stub portions 316 extend generally parallel to the cross members 310. The cross stub portions 316 are coupled to corresponding lateral members 312 and/or lateral stub portions 318. The lateral stub portions 318 extend generally parallel to the lateral members 312. The lateral stub portion 318 are coupled to corresponding cross members 310 and/or cross stub portions 316.

The secondary antenna element 400 includes one or more antenna members 402 extending from a feed point 404 to an end 406 of the antenna element 400. The antenna members 402 are conductive elements, such as copper conductors. In an exemplary embodiment, the antenna members 402 include a main portion 410 extending from the feed point 404 to the end 406. The main portion 410 extends along one side of the primary antenna element 300, such as along the right side. The antenna members 402 includes tab portion 412 extending from the main portion 410 at the end 406. The secondary antenna element 400 may have other shapes in alternative embodiments. In an exemplary embodiment, the feed point 404 is electrically common with the feed point 304. As such, a single feed may be used to feed both antenna elements 300, 400.

The antenna assembly 100 includes a feed cable 500 electrically connected to the feed point(s) 304, 404. In an exemplary embodiment, the feed cable 500 is a coaxial cable having a center conductor defining a feed line 502 of the feed cable 500. For the outer conductor of the coaxial cable forms a cable shield (not shown) surrounding the feed line 502 along the length of the feed cable 500. In the insulator (not shown) is provided between the center conductor and the outer conductor. A cable jacket 504 surrounds the cable shield. In an exemplary embodiment, the feed cable 500 includes a ground wire 506 configured to be electrically grounded. In the illustrated embodiment, the ground wire 506 has a ring terminal 508 at an end of the ground wire 506. The opposite end of the ground wire 506 may be electrically connected to the outer conductor of the feed cable 500. The ring terminal 508 may be electrically grounded to the vehicle, such as to the frame vehicle, using a threaded fastener, such as a screw. The ground wire 506 may be electrically terminated to the vehicle by other means in alternative embodiments, such as welding or soldering to the frame for electrical connection to another portion of the vehicle.

Figure 3:
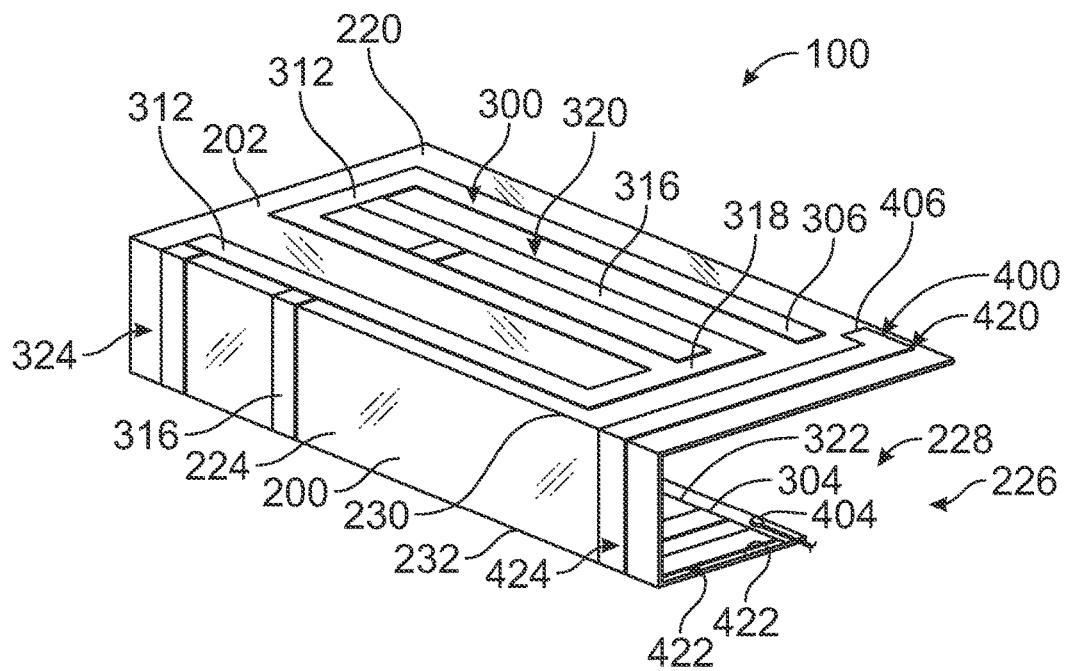
FIG. 3 is a top perspective view of the antenna assembly in accordance with an exemplary embodiment.
Figure 4:
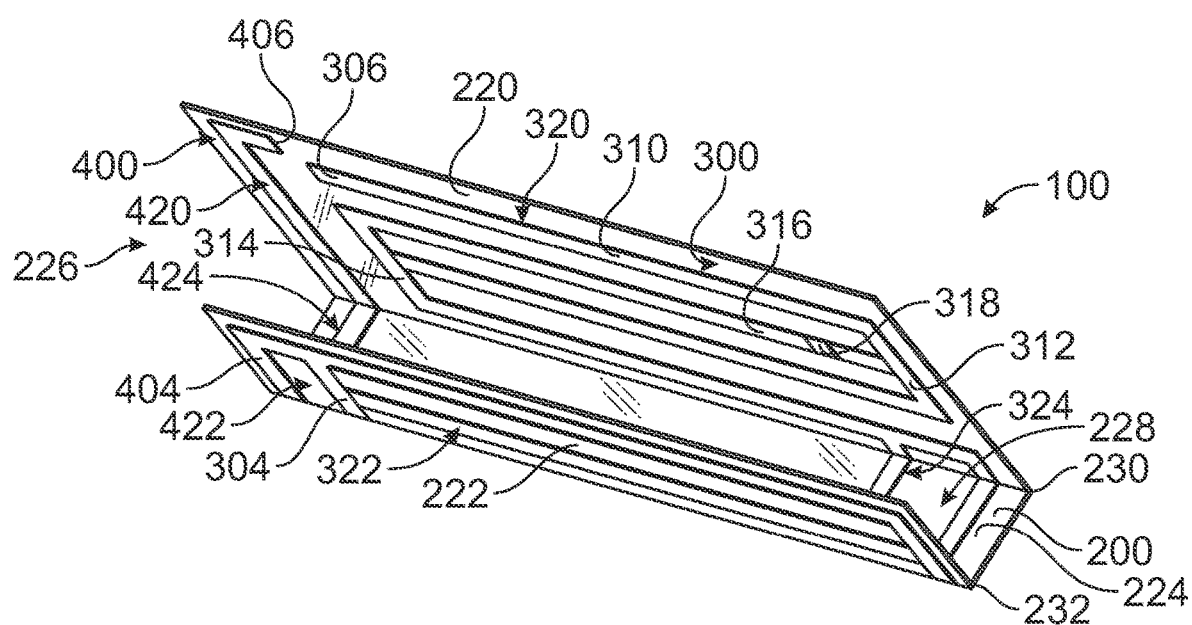
FIG. 4 is a top perspective view of the antenna assembly in accordance with an exemplary embodiment.

FIG. 3 is a top perspective view of the antenna assembly 100 in accordance with an exemplary embodiment. FIG. 4 is a top perspective view of the antenna assembly 100 in accordance with an exemplary embodiment. FIGS. 3 and 4 illustrates the antenna assembly 100 in a formed antenna shape. For example, the flexible film 202 of the substrate 200 may be folded or bent at locations into a shape complementary to the shape of the spoiler 102 (shown in FIG. 1). In the illustrated embodiment, the antenna assembly 100 is C-shaped. The antenna assembly 100 may have other shapes in alternative embodiments.

When formed, the substrate 200 includes an upper substrate portion 220, a lower substrate portion 222, and a rear substrate portion 224 between the upper substrate portion 220 and the lower substrate portion 222. A front opening 226 is located between the upper substrate portion 220 and the lower substrate portion 222 opposite the rear substrate portion 224. The front opening 226 is open to a gap or space 228 located between the upper substrate portion 220 and the lower substrate portion 222. In an exemplary embodiment, the rear substrate portion 224 is oriented generally vertically. The rear substrate portion 224 may be generally planar. Alternatively, the rear substrate portion 224 may be curved. The upper substrate portion 220 extends from a top of the rear substrate portion 224. The upper substrate portion 220 meets the rear substrate portion 224 at an upper corner 230. In an exemplary embodiment, the upper substrate portion 220 is oriented generally horizontally. In various embodiments, the upper substrate portion 220 may be angled slightly upward from the horizontal plane. The upper substrate portion 220 may be generally planar. Alternatively, the upper substrate portion 220 may be curved. The lower substrate portion 222 extends from a bottom of the rear substrate portion 224. The lower substrate portion 222 meets the rear substrate portion 224 at a lower corner 232. In an exemplary embodiment, the lower substrate portion 222 is oriented generally horizontally. In various embodiments, the lower substrate portion 222 may be angled slightly downward from the horizontal plane. The lower substrate portion 222 may be generally planar. Alternatively, the lower substrate portion 222 may be curved.

The antenna element 300 includes an upper antenna portion 320, a lower antenna portion 322, and a rear antenna portion 324 between the upper antenna portion 320 and the lower antenna portion 322. The upper antenna portion 320 is provided on the upper substrate portion 220. The lower antenna portion 322 is provided on the lower substrate portion 222. The rear antenna portion 324 is provided on the rear substrate portion 224. In an exemplary embodiment, the upper antenna portion 320 is angled approximately perpendicular to the rear antenna portion 324 and the lower antenna portion 322 is angled approximately perpendicular to the rear antenna portion 324. Optionally, the upper antenna portion 320 may be oriented generally parallel to the lower antenna portion 322. Alternatively, the upper antenna portion 320 and/or the lower antenna portion 322 may be angled outward from the upper corner 230 and/or the lower corner 232, respectively. The rear antenna portion 324 extends generally vertically and defines a majority of the height of the antenna element 300. The upper antenna portion 320 and/or the lower antenna portion 322 may define at least a portion of the height of the antenna element 300 to increase the overall height of the antenna element 300 between the antenna feed point 304 and the end 306 of the antenna element 300.

In an exemplary embodiment, the upper antenna portion 320 includes at least one cross member 310 and at least one lateral member 312. In various embodiments, the upper antenna portion 320 includes at least one stub portion 314. In an exemplary embodiment, the lower antenna portion 322 includes at least one cross member 310 and at least one lateral member 312. In various embodiments, the lower antenna portion 322 includes at least one stub portion 314. In an exemplary embodiment, the rear antenna portion 324 includes at least one cross member 310 and at least one lateral member 312. In various embodiments, the rear antenna portion 324 includes at least one stub portion 314. In an exemplary embodiment, cross members 310 (or cross stub portions 316) may be provided proximate to the upper corner 230 and/or the lower corner 232. For example, one of the cross members 310 (or cross stub portions 316) may be provided along the upper substrate portion 220 adjacent the upper corner 230 or along the rear substrate portion 224 adjacent the upper corner 230. Similarly, one of the cross members 310 (or cross stub portions 316) may be provided along the lower substrate portion 222 adjacent the lower corner 232 or along the rear substrate portion 224 adjacent the lower corner 232.

The secondary antenna element 400 includes an upper DAB portion 420, a lower DAB portion 422, and a rear DAB portion 424 between the upper DAB portion 420 and the lower DAB portion 422. The upper DAB portion 420 is provided on the upper substrate portion 220. The lower DAB portion 422 is provided on the lower substrate portion 222. The rear DAB portion 424 is provided on the rear substrate portion 224. The rear DAB portion 424 extends generally vertically and defines a majority of the height of the secondary antenna element 400. The upper DAB portion 420 and/or the lower DAB portion 422 may define at least a portion of the height of the antenna element 400 to increase the overall height of the secondary antenna element 400 between the antenna feed point 404 and the end 406 of the antenna element 400.

Figure 5:
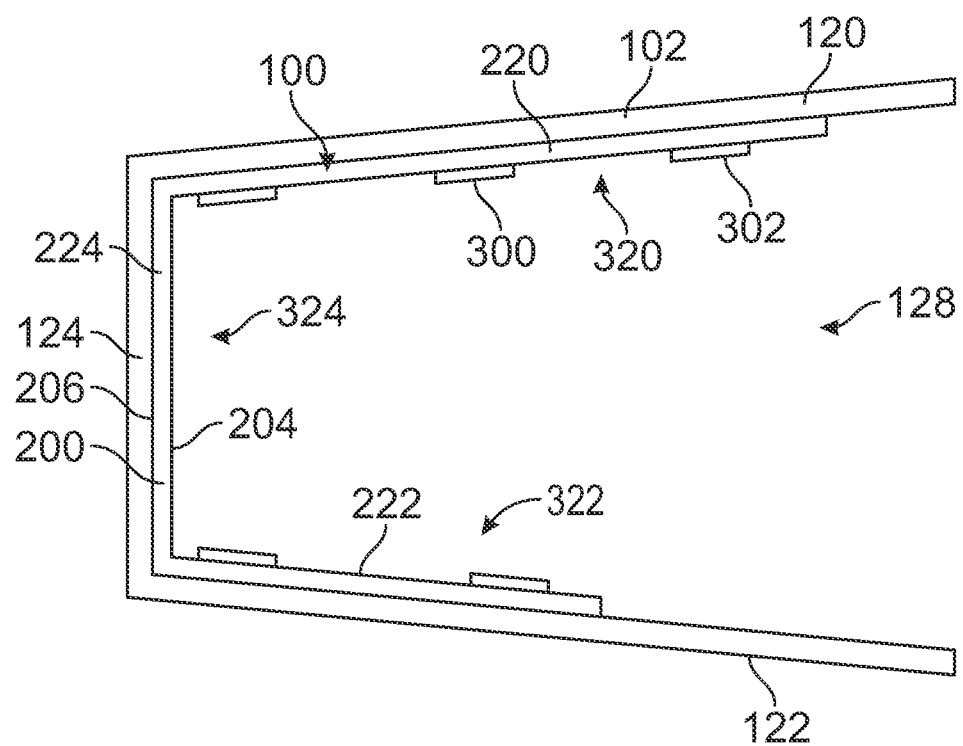
FIG. 5 is a cross-sectional view of the antenna assembly in the spoiler in accordance with an exemplary embodiment.

FIG. 5 is a cross-sectional view of the antenna assembly 100 in the spoiler 102 in accordance with an exemplary embodiment. The substrate 200 is located in the interior enclosure 128 and coupled to the interior surface of the spoiler 102. For example, the outer surface 206 is coupled to the interior surface of the spoiler 102, such as using adhesive, fasteners, and the like. In an exemplary embodiment, the conductive antenna members 302 of the antenna elements 300 are arranged along the inner surface 204 of the substrate 200. Alternatively, the conductive antenna members 302 may be provided at an internal layer of the substrate 200.

The upper substrate portion 220 is coupled to the upper wall 120. As such, the upper antenna portion 320 (and the upper DAB portion 420) extends along the upper wall 120. The lower substrate portion 222 is coupled to the lower wall 122. As such, the lower antenna portion 322 (and the lower DAB portion 422) extends along the lower wall 122. The rear substrate portion 224 is coupled to the rear wall 124. As such, the rear antenna portion 324 (and the rear DAB portion 424) extends along the rear wall 124.

Figure 6:
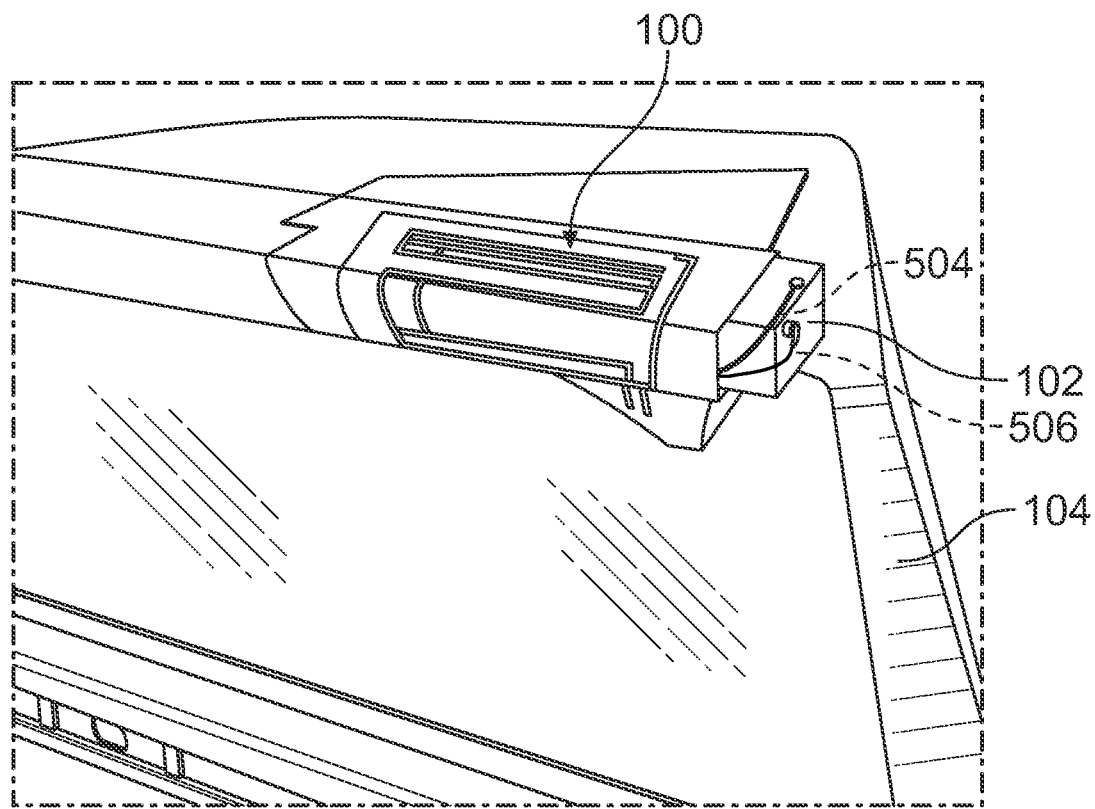
FIG. 6 is a perspective view of the antenna assembly (shown in phantom) in the spoiler of the vehicle in accordance with an exemplary embodiment.
Figure 7:
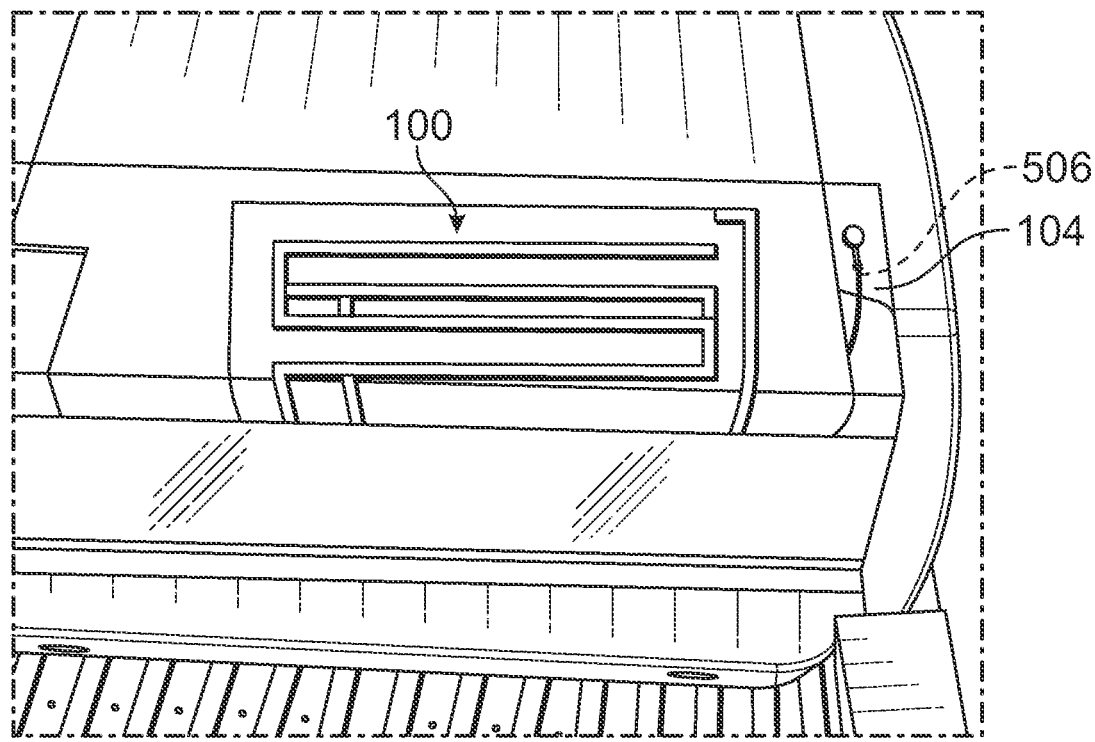
FIG. 7 is a top view of the antenna assembly (shown in phantom) in the spoiler of the vehicle de in accordance with an exemplary embodiment.

FIG. 6 is a perspective view of the antenna assembly 100 (shown in phantom) in the spoiler 102 of the vehicle 104 in accordance with an exemplary embodiment. FIG. 7 is a top view of the antenna assembly 100 (shown in phantom) in the spoiler 102 of the vehicle 104 in accordance with an exemplary embodiment. The antenna assembly 100 is shown at the right side of the spoiler 102. Other locations are possible in alternative embodiments. In the illustrated embodiment, the spoiler 102 is a rear, roof spoiler of a truck. The spoiler 102 may be used in other types of vehicles in alternative embodiments. The feed cable 500 extends from the antenna assembly 100 and may be routed into an internal compartment in the frame of the vehicle. The ground wire 506 extends from the antenna assembly 100 and may be terminated (for example, grounded) to the frame, such as using a ground screw.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An antenna assembly for installation on a spoiler of a vehicle, the antenna assembly comprising:
    a substrate having an inner surface and an outer surface, the outer surface configured to be coupled to an interior surface of the spoiler of the vehicle, the substrate including an upper substrate portion, a lower substrate portion and a rear substrate portion between the upper substrate portion and the lower substrate portion, the upper and lower substrate portions being oriented generally horizontally, the rear substrate portion being oriented generally vertically, wherein the upper substrate portion joins the rear substrate portion at an upper corner and the lower substrate portion joins the rear substrate portion at a lower corner;
    an antenna element coupled to the substrate, the antenna element including antenna members in a serpentine antenna pattern including cross members extending across the substrate and lateral members extending between the cross members, the antenna element including an upper antenna portion, a lower antenna portion and a rear antenna portion between the upper antenna portion and the lower antenna portion, the upper antenna portion provided on the upper substrate portion, the lower antenna portion provided on the lower substrate portion, the rear antenna portion provided on the rear substrate portion, the upper antenna portion including one of the cross members proximate to the upper corner, the lower antenna portion including one of the cross members proximate to the lower corner.

2. The antenna assembly of claim 1, wherein the upper antenna portion is angled approximately perpendicular to the rear antenna portion and the lower antenna portion is angled approximately perpendicular to the rear antenna portion.

3. The antenna assembly of claim 1, wherein the upper antenna portion includes at least one crossmember and at least one lateral member, the rear antenna portion including at least one crossmember and at least one lateral member, the lower antenna portion including at least one crossmember and at least one lateral member.

4. The antenna assembly of claim 1, wherein the antenna element includes a plurality of stub portions between the cross members.

5. The antenna assembly of claim 4, wherein the upper antenna portion includes at least one stub portion, the rear antenna portion includes at least one stub portion, and the lower antenna portion includes at least one stub portion.

6. The antenna assembly of claim 1, wherein the antenna element includes cross stub portions parallel to the cross members and coupled to corresponding lateral members, and wherein the antenna element includes lateral stub portions parallel to the lateral members and coupled to corresponding cross members.

7. The antenna assembly of claim 1, wherein the substrate includes a flexible film, the antenna members being metallized copper conductors on the flexible film.

8. The antenna assembly of claim 1, wherein the antenna element has a height defined between the upper antenna portion and the lower antenna portion, the rear antenna portion defining a majority of the height of the antenna element.

9. The antenna assembly of claim 8, wherein the upper antenna portion defines at least a portion of the height of the antenna element.

10. The antenna assembly of claim 1, wherein the antenna element includes a ground configured to be electrically grounded to the frame of the truck.

11. The antenna assembly of claim 1, further comprising a feed cable having a feed line electrically coupled to the antenna element and a ground configured to be electrically grounded to the frame of the truck.

12. The antenna assembly of claim 1, wherein the antenna element operates as an AM/FM antenna element, the antenna assembly further comprising a secondary antenna element coupled to the substrate, the secondary antenna element operating as a digital audio broadcasting (DAB) antenna element.

13. The antenna assembly of claim 12, wherein the secondary antenna element includes an upper DAB portion, a lower DAB portion, and a rear DAB portion between the upper DAB portion and the lower DAB portion, the upper DAB portion provided on the upper substrate portion, the lower DAB portion provided on the lower substrate portion, and the rear DAB portion provided on the rear substrate portion.

14. The antenna assembly of claim 12, further comprising a feed cable having a feed line electrically coupled to the antenna element and the secondary antenna element.

15. The antenna assembly of claim 1, wherein the antenna element is C-shaped having an open front end between the upper and lower antenna portions opposite the rear antenna portion.

16. An antenna assembly for a vehicle, the antenna assembly comprising:
an antenna housing having an upper wall, a lower wall, and a rear wall between the upper wall and the lower wall, the antenna housing forming a spoiler of the vehicle, the antenna housing having an interior enclosure defined by the upper wall, the lower wall, and the rear wall; and
an antenna assembly received in the interior enclosure, the antenna assembly including a substrate and an antenna element coupled to the substrate;
the substrate having an inner surface and an outer surface, the outer surface being coupled to the antenna housing, the substrate including an upper substrate portion, a lower substrate portion and a rear substrate portion between the upper substrate portion and the lower substrate portion, the upper and lower substrate portions being oriented generally horizontally, the rear substrate portion being oriented generally vertically, the upper substrate portion coupled to the upper wall, the rear substrate portion coupled to the rear wall, the lower substrate portion coupled to the lower wall;
the antenna element including antenna members in a serpentine antenna pattern including cross members extending across the substrate and lateral members extending between the cross members, the antenna element including an upper antenna portion, a lower antenna portion and a rear antenna portion between the upper antenna portion and the lower antenna portion, the upper antenna portion provided on the upper substrate portion, the lower antenna portion provided on the lower substrate portion, the rear antenna portion provided on the rear substrate portion, wherein the upper antenna portion includes at least one crossmember and at least one lateral member, and wherein the lower antenna portion includes at least one crossmember and at least one lateral member.

17. The antenna assembly of claim 16, wherein the upper substrate portion joins the rear substrate portion and an upper corner and the lower substrate portion joins the rear substrate portion at a lower corner, the upper antenna portion including one of the cross members proximate to the upper corner, the lower antenna portion including one of the cross members proximate to the lower corner.

18. The antenna assembly of claim 16, wherein the antenna housing is configured to be coupled to a cab of the vehicle above a rear window of the vehicle.

19. The antenna assembly of claim 16, wherein the antenna element includes a plurality of stub portions between the cross members, wherein the upper antenna portion includes at least one stub portion, the rear antenna portion includes at least one stub portion, and the lower antenna portion includes at least one stub portion.

20. An antenna assembly for installation on a spoiler of a vehicle, the antenna assembly comprising:
a substrate having an inner surface and an outer surface, the outer surface configured to be coupled to an interior surface of the spoiler of the vehicle, the substrate including an upper substrate portion, a lower substrate portion and a rear substrate portion between the upper substrate portion and the lower substrate portion, the upper and lower substrate portions being oriented generally horizontally, the rear substrate portion being oriented generally vertically;
a primary antenna element coupled to the substrate, the primary antenna element including primary antenna members in a serpentine antenna pattern including cross members extending across the substrate and lateral members extending between the cross members, the primary antenna element including an upper antenna portion, a lower antenna portion and a rear antenna portion between the upper antenna portion and the lower antenna portion, the upper antenna portion provided on the upper substrate portion, the lower antenna portion provided on the lower substrate portion, the rear antenna portion provided on the rear substrate portion, the primary antenna element operating as AM/FM antenna element; and
a secondary antenna element coupled to the substrate, the secondary antenna element operating as a digital audio broadcasting (DAB) antenna element, wherein the secondary antenna element includes an upper DAB portion, a lower DAB portion, and a rear DAB portion between the upper DAB portion and the lower DAB portion, the upper DAB portion provided on the upper substrate portion, the lower DAB portion provided on the lower substrate portion, and the rear DAB portion provided on the rear substrate portion.

* * * * *